(12) United States Patent
Lee et al.

(10) Patent No.: US 9,835,878 B2
(45) Date of Patent: Dec. 5, 2017

(54) WEARABLE EYEGLASS DEVICE

(71) Applicant: ELECTRONICS AND TELECOMMUNICATIONS RESEARCH INSTITUTE, Daejeon (KR)

(72) Inventors: Dong-Woo Lee, Daejeon (KR); Hyung-Cheol Shin, Daejeon (KR); Ga-Gue Kim, Daejeon (KR); Sung-Yong Shin, Daejeon (KR); Gi-Su Heo, Jeonju-si (KR); Yong-Ki Son, Daejeon (KR); Hyun-Tae Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 289 days.

(21) Appl. No.: 14/610,050

(22) Filed: Jan. 30, 2015

(65) Prior Publication Data
US 2015/0219933 A1 Aug. 6, 2015

(30) Foreign Application Priority Data

Feb. 3, 2014 (KR) ........................ 10-2014-0012300

(51) Int. Cl.
*G06F 3/042* (2006.01)
*G06F 3/0488* (2013.01)
*G02C 11/00* (2006.01)
*G02B 27/01* (2006.01)

(52) U.S. Cl.
CPC ............ *G02C 11/10* (2013.01); *G02B 27/017* (2013.01); *G02B 27/0172* (2013.01); *G06F 3/0421* (2013.01); *G02B 2027/014* (2013.01); *G02B 2027/0178* (2013.01)

(58) Field of Classification Search
CPC ................ G02C 11/10; G02B 27/0172; G02B 2027/0178; G06F 3/042; G06F 3/048; G06F 3/0484
USPC .......................................... 345/175; 351/158
See application file for complete search history.

(56) References Cited

U.S. PATENT DOCUMENTS

| 4,961,626 A * | 10/1990 | Fournier, Jr. | A42B 3/042 345/8 |
| 2012/0105310 A1* | 5/2012 | Sverdrup | G02B 27/017 345/8 |
| 2012/0127102 A1* | 5/2012 | Uenohara | G06F 3/0486 345/173 |

(Continued)

FOREIGN PATENT DOCUMENTS

KR 10-2010-0067881 6/2010

Primary Examiner — Benjamin C Lee
Assistant Examiner — Jeffrey S Steinberg
(74) Attorney, Agent, or Firm — Staas & Halsey LLP

(57) ABSTRACT

Disclosed herein is a wearable eyeglass device including: an optical communication module receiving a first optical signal and transmitting a second optical signal; a display module displaying information corresponding to at least one of the first and second optical signals; and a control module controlling the display module to display first information corresponding to the first optical signal at the time of receiving the first optical signal and controlling the optical communication module to transmit the second optical signal corresponding to second information.

13 Claims, 4 Drawing Sheets

(56) References Cited

U.S. PATENT DOCUMENTS

| | | | |
|---|---|---|---|
| 2013/0044042 A1 | 2/2013 | Olsson et al. | |
| 2013/0227409 A1* | 8/2013 | Das | H04L 51/32 715/702 |
| 2013/0249945 A1* | 9/2013 | Kobayashi | G06T 19/006 345/633 |
| 2014/0184496 A1* | 7/2014 | Gribetz | G02B 27/017 345/156 |
| 2015/0061974 A1* | 3/2015 | Kobayashi | G02B 27/017 345/8 |

* cited by examiner

WEARABLE EYEGLASS DEVICE

CROSS REFERENCE TO RELATED APPLICATION

This application claims the benefit of Korean Patent Application No. 10-2014-0012300, filed on Feb. 3, 2014, entitled "Wearable Eyeglass Device", which is hereby incorporated by reference in its entirety into this application.

BACKGROUND OF THE INVENTION

1. Technical Field

The embodiments of the present invention relates to a wearable eyeglass device, and more particularly, to a wearable eyeglass device capable of easily transmitting and receiving data as optical signals to and from an external optical communication device.

2. Description of the Related Art

Generally, many application services for a smart phone have been developed.

The smart phone has many advantages such as provision of various services using various dedicated applications, or the like, using rapid computing, in addition to a phone function. However, since the smart phone is in a state in which it is held with a hand or is put in a pocket, the smart phone has a disadvantage that a process of taking the smart phone out of the pocket or holding the smart phone with the hand should be performed in order to confirm information.

Recently, an eyeglass type device has been steadily studied in augmented reality and virtual reality services, and a head mounted display (HMD) and the Google Glasses of which commercialization has recently been attempted by Google have been developed.

That is, an eyeglass may be utilized as a significantly attractive display device in that it may represent information in front on eyes of a person.

Recently, research into a technology of connecting application services used in the smart phone to the eyeglass has been conducted.

SUMMARY OF THE INVENTION

An object of the present invention is to provide a wearable eyeglass device capable of easily transmitting and receiving data as optical signals to and from an external optical communication device.

According to an exemplary embodiment of the present invention, there is provided a wearable eyeglass device including: an optical communication module receiving a first optical signal and transmitting a second optical signal; a display module displaying information corresponding to at least one of the first and second optical signals; and a control module controlling the display module to display first information corresponding to the first optical signal at the time of receiving the first optical signal and controlling the optical communication module to transmit the second optical signal corresponding to second information.

The display module may be a beam projector displaying at least one of the first information and the second information on a lens depending on a control of the control module.

The optical communication module may include a front surface optical communication module positioned on a front surface of an eyeglass, which is a user's gaze direction, and a side surface optical communication module positioned on a side surface of the eyeglass.

Each of the front surface optical communication module and the side surface optical communication module may include: a light receiving unit receiving the first optical signal; and a light transmitting unit transmitting the second optical signal.

The front surface optical communication module may further include an optical element allowing only an optical signal incident from the front surface of the eyeglass to be received.

The light receiving unit may include a plurality of light receiving elements receiving the first optical signal.

The plurality of light receiving elements may generate a first signal corresponding to the first optical signal and transfer the first signal to the control module.

The plurality of light receiving elements may be at least one of a photo diode (PD) and an avalanche photo diode (APD).

The light transmitting unit may include a plurality of light emitting elements transmitting the second optical signal.

The plurality of light emitting elements may transmit the second optical signal corresponding to a second signal transferred from the control module.

The plurality of light emitting elements may be at least one of a light emitting diode (LED), a laser diode (LD), and a solid laser.

The optical communication module may further include a touch input judging unit judging an input of a user depending on a pattern of the plurality of light receiving elements covered by user's fingers when ambient light or the first optical signal is incident.

The touch input judging unit may judge whether the input of the user is a touch or a drag depending on a temporal pattern of the plurality of light receiving elements covered by the user's fingers.

The control module may control an application program and the display module depending on a result of the judgment for the input of the user.

The wearable eyeglass device may further include a data communication module transmitting and receiving data to and from an external server.

DESCRIPTION OF THE EXEMPLARY EMBODIMENTS

Figure 1:
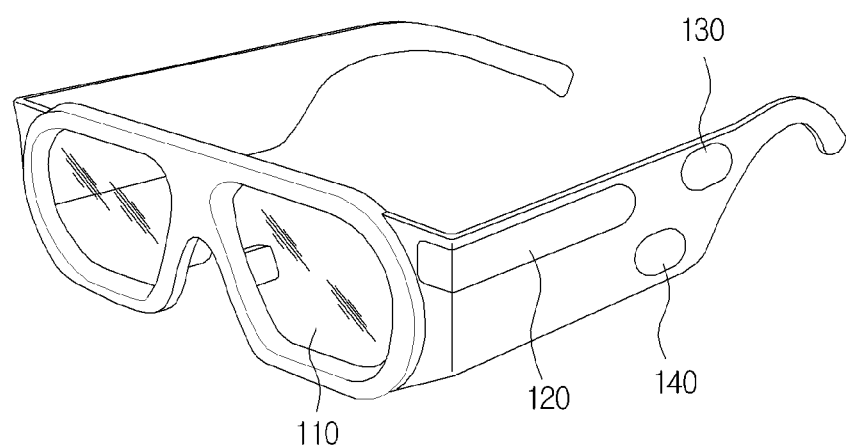
FIG. 1 is a diagram showing a schematic structure of a wearable eyeglass device according to an exemplary embodiment of the present invention.

The following description illustrates only a principle of the present invention. Therefore, those skilled in the art may implement the principle of the present invention and invent various devices included in the spirit and scope of the present invention although not clearly described or shown in the present specification. In addition, it is to be understood that all conditional terms and exemplary embodiments mentioned in the present specification are basically intended only to allow those skilled in the art to understand a concept of the present invention, and the present invention is not limited to exemplary embodiments and states particularly mentioned as such.

Further, it is to be understood that all detailed descriptions mentioning a specific exemplary embodiment of the present invention as well as principles, aspects, and exemplary embodiments of the present invention are intended to include structural and functional equivalences thereof. Further, it is to be understood that these equivalences include an equivalence that will be developed in the future as well as an equivalence that is current well-known, that is, all devices invented so as to perform the same function regardless of a structure.

Therefore it is to be understood that, for example, a block diagram of the present specification shows an illustrative conceptual aspect for embodying a principle of the present invention. Similarly, it is to be understood that all flow charts, state transition diagrams, pseudo-codes, and the like, show various processes that may be tangibly embodied in a computer-readable medium and that are executed by computers or processors regardless of whether or not the computers or the processors are clearly shown.

Functions of various devices including processors or functional blocks represented as concepts similar to the processors and shown in the accompanying drawings may be provided by hardware having capability to execute appropriate software as well as dedicated hardware. When the functions are provided by the processors, they may be provided by a single dedicated processor, a single shared processor, or a plurality of individual processors and some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become more obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make the gist of the present invention unclear, it will be omitted.

FIG. 1 is a diagram showing a schematic structure of a wearable eyeglass device according to an exemplary embodiment of the present invention. The wearable eyeglass device is configured to include a display module 110 displaying an image on an eyeglass lens, an optical communication module 120 receiving a first optical signal input from an external illumination communication device to generate a first signal corresponding to the first optical signal and generating a second optical signal corresponding to a second signal that is input to transmit the second optical signal to the external illumination communication device, a data communication module 130 enabling data communication with an external server, or the like, and a control module 140 controlling the display module 110, the optical communication module 120, and the data communication module 130, as shown in FIG. 1.

Figure 2:
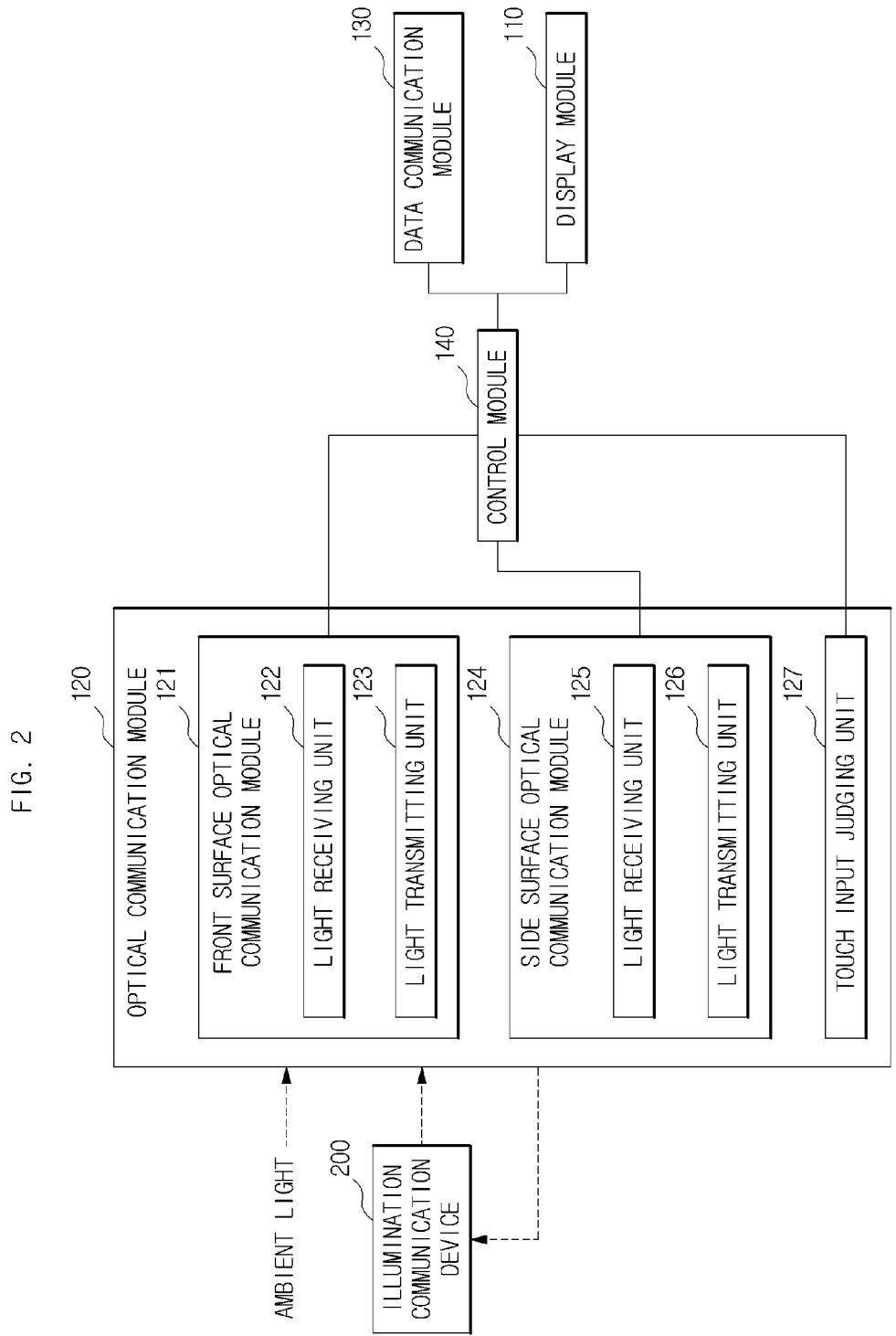
FIG. 2 is a block diagram showing a more detailed configuration of the wearable eyeglass device according to an exemplary embodiment of the present invention.
Figure 3:
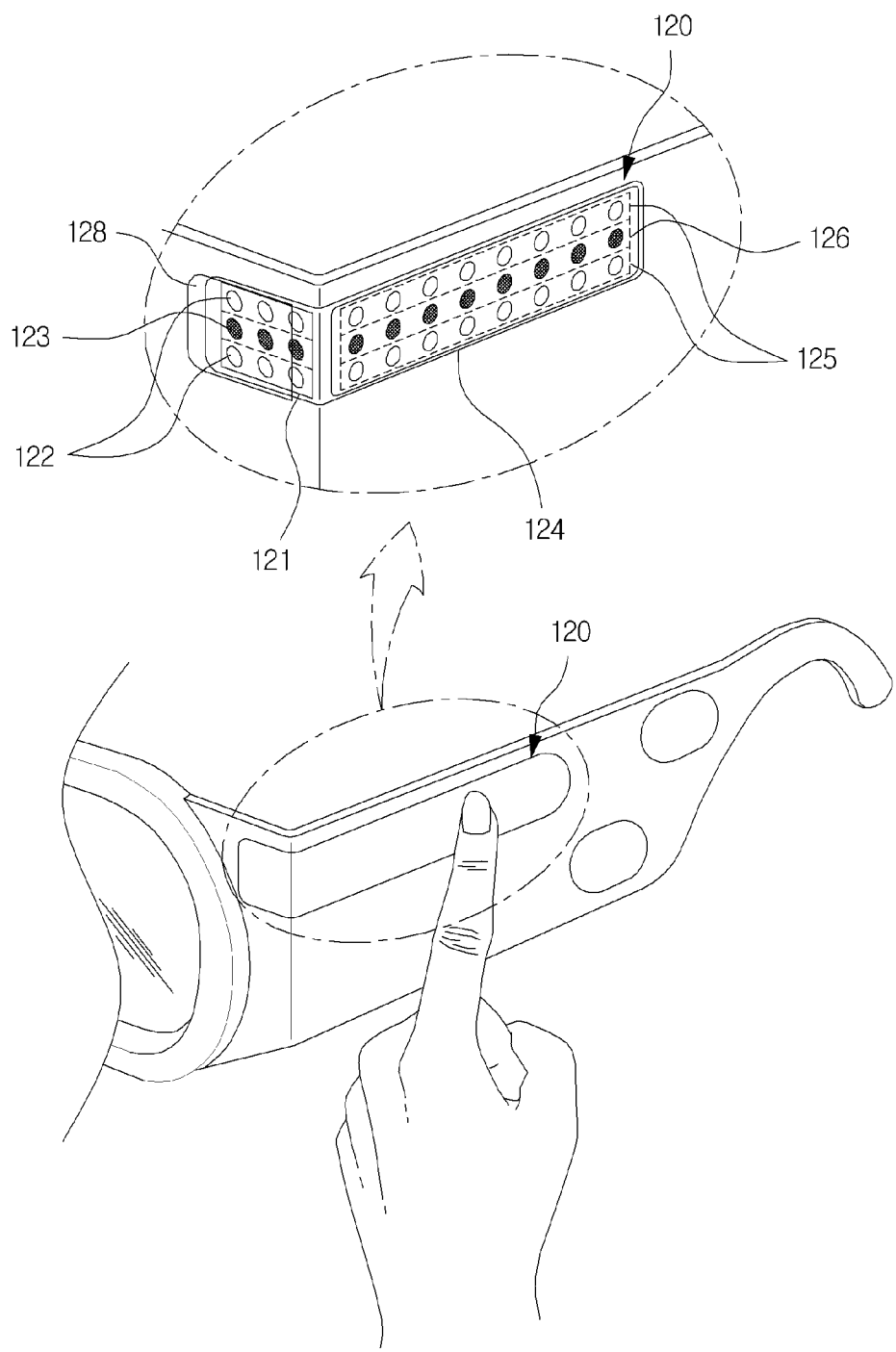
FIG. 3 is a diagram showing a more detailed structure of an optical communication module 120 in the wearable eyeglass device according to an exemplary embodiment of the present invention.

FIG. 2 is a block diagram showing a more detailed configuration of the wearable eyeglass device according to an exemplary embodiment of the present invention; and FIG. 3 is a diagram showing a more detailed structure of an optical communication module 120 in the wearable eyeglass device according to an exemplary embodiment of the present invention.

The display module 110 may display an application program and an image photographed by a camera module (not shown) on an eyeglass lens (not shown) of the wearable eyeglass device.

That is, the display module 110 may display information desired by a user and information on an application program executed by the user on any region of the lens made of glass or plastic so that the user may confirm the information with the naked eyes.

The display module 110 may be a beam projector (not shown) operated depending on a control of the control module 140, but is not limited thereto.

The optical communication module 120 includes a front surface optical communication module 121 positioned on a front surface of the wearable eyeglass device, which is a user's gaze direction, and a side surface optical communication module 124 positioned on a side surface of the wearable eyeglass device. The front surface optical communication module 121 includes a light receiving unit 122 receiving the first optical signal from the outside and a light transmitting unit 123 transmitting the second optical signal to the outside. The side surface optical communication module 124 also includes a light receiving unit 125 receiving the first optical signal from the outside and a light transmitting unit 126 transmitting the second optical signal to the outside.

Further, the front surface optical communication module 121 may further include an optical element such as a polarizing element 128 blocking light from surfaces other than the front surface such as ambient light, or the like, so that it may receive only an optical signal incident from a front surface of the user, that is, the front surface of the wearable eyeglass device.

The optical communication module 120 may receive a first optical signal transmitted from an external illumination communication device 200 to generate a first signal, and transmit a second optical signal corresponding to a second signal input from the control module 140 to the illumination communication device 200.

That is, the front surface optical communication module 121 and the side surface optical communication module 124 of the optical communication module 120 include the light receiving units 122 and 125 receiving the first optical signal to generate the first signal and the light transmitting units 123 and 126 transmitting the second optical signal corresponding to the second signal, respectively.

Further, the optical communication module 120 further includes a touch input judging unit 127 judging a touch input of the user by analyzing a pattern of light receiving elements covered by user's fingers among a plurality of light receiving elements configured in the light receiving unit 122 or 125 when the ambient light and the first optical signal are incident. In an exemplary embodiment of the present invention, the touch input judging unit 127 judges whether an input of the user is a touch or a drag from the pattern generated over time by the plurality of light receiving elements.

Referring to FIG. 3, the light receiving units 122 and 125 may include a plurality of light receiving elements for receiving the first optical signal. The plurality of light receiving elements may be at least one of a photo diode (PD) and an avalanche photo diode (APD) or may be another element receiving light, but are not limited thereto.

The light receiving elements configuring the light receiving unit 122 of the front surface optical communication module 121 may be disposed on a front surface portion of an eyeglass frame of the wearable eyeglass device, that is, on a front surface of a user's face. On the other hand, the light receiving elements configuring the light receiving unit 125 of the side surface optical communication module 124 may be disposed on a side surface portion of the eyeglass frame of the wearable eyeglass device, that is, on a side surface of the user's face.

In the case in which the plurality of light receiving elements receive the first optical signal, the light receiving units 122 and 125 may transmit a plurality of first signals or one first signal to the control module 140 depending on signal strength of the first optical signal.

The wearable eyeglass device according to an exemplary embodiment of the present invention may receive optical signals only in a front surface direction of the eyeglass, that is, a direction toward which a user's gaze or head is directed through the front surface optical communication module 121 described above, such that it may perform direct directional data communication with an illumination communication device in a gaze direction in which the intention of the user is reflected.

Referring to FIG. 3, the light transmitting units 123 and 126 may include a plurality of light emitting elements transmitting the second optical signal corresponding to the second signal supplied by the control module 140. The plurality of light emitting elements may be at least one of a light emitting diode (LED), a laser diode (LD), and a solid laser, or may be another element that may convert the second signal into an optical signal, but are not limited thereto.

Here, the number and positions of plurality of light emitting elements disposed in the eyeglass frame may correspond to those of plurality of light receiving elements included in the light receiving unit 122.

In an exemplary embodiment of the present invention, the light receiving units 122 and 125 may be formed with the light transmitting units 123 and 126 interposed therebetween, respectively, which is to facilitate reception of the first optical signal transmitted by the illumination communication device 200.

Here, the light transmitting units 123 and 126 may transmit the second optical signal including a plurality of lights emitted depending on the second signal supplied to each of the plurality of light emitting elements to the illumination communication device 200.

The touch input judging unit 127 judges that a touch input of the user has been generated when the first optical signal is covered by the user's fingers during reception of the ambient light or the first optical signal, such that it is not input to the light receiving unit 122. Here, the touch input judging unit 127 may judge the touch input of the user by analyzing the pattern of the light receiving elements covered by the user's fingers among the plurality of light receiving elements. For example, the touch input judging unit 127 judges whether the input of the user is a touch or a drag from the pattern generated over time by the plurality of light receiving elements.

Further, the touch input judging unit 127 may include an acceleration sensor (not shown) and may accurately judge shaking or a touch input at the time of movement of the user depending on an acceleration value measured by the acceleration sensor.

For example, the touch of the user is recognized in the case in which the ambient light or the first optical signal entering some of the light receiving elements of the light receiving units 122 and 125 is instantaneously covered by the users fingers, such that the first signal is instantaneously interrupted for a very short time, and the drag of the user is recognized in the case in which the ambient light or the first optical signal in a series of light receiving elements of the light receiving units 122 and 125 is continuously covered over time by the users fingers.

The control module 140 may control the front surface optical communication module 121 and the side surface optical communication module 124 depending on the setting. In addition, the control module 140 controls an application program so as to correspond to an input event of the user judged by the touch input judging unit 127 and displays information depending on the control through the display module 110.

Further, the control module 140 may control the application program depending on the first signal in the case in which the first signal is input from the light receiving units 122 and 125 and display information depending on the control through the display module 110.

Further, the control module 140 may control the light transmitting units 123 and 126 to transmit the second optical signal corresponding to the second signal to the illumination communication device 200, thereby making it possible to transfer desired information to the illumination communication device 200.

Further, the wearable eyeglass device according to an exemplary embodiment of the present invention may include the data communication module 130 enabling the data communication with the external server.

For example, in the case in which the user executes any game application program, the data communication module 130 may transmit access information on accessing the game application program to the server and receive data on a user character stored in the server, but is not limited thereto.

Figure 4:
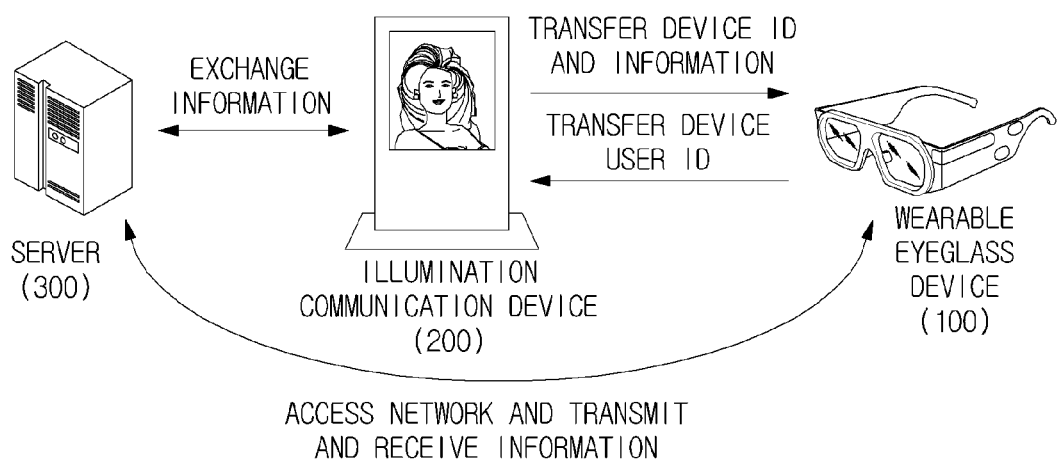
FIG. 4 is a diagram showing a communication system representing data communication using the wearable eyeglass device according to an exemplary embodiment of the present invention.

FIG. 4 is a diagram showing a communication system representing data communication using the wearable eyeglass device according to an exemplary embodiment of the present invention.

Referring to FIG. 4, the communication system may include the wearable eyeglass device 100, the illumination communication device 200, and a server 300.

The illumination communication device 200 and the wearable eyeglass device 100 may transmit and receive data such as IDs of the devices, IDs of the users, position information, personal preference information, network access information, or the like, which are identification information, therebetween using an illumination communication interface. The wearable eyeglass device 100 may output the received information to the display module or transmit and receive data through direct connection with the server 300, or the like, through a network access, if necessary. The user may interact with the wearable eyeglass device 100 to control the system as well as output information of the wearable eyeglass device 100 and an application program. The illumination communication device 200 and the server 300 may also be configured integrally with each other, and the illumination communication device 200 may be replaced by various devices such as a digital signage, a television (TV), a light emitting diode (LED) streetlamp, or the like, in which an illumination communication function is embedded.

A specific application example of the communication system as described above will be described below. When the illumination communication device 200 sends an advertisement for any product in a home shopping, it transmits an optical signal corresponding to product information such as a product ID, a product cost, a product salesclerk, and the like, for any product. In this case, the wearable eyeglass device 100 receives the optical signal transmitted by the illumination communication device 200 and displays the product information corresponding to the optical signal on the lens. Then, when the user touch-inputs the product ID for any product to the server to 300 corresponding to the product salesclerk included in the product information displayed on the lens, the wearable eyeglass device 100 transmits user information such as an ID, payment card information, a position, and the like, of the user using the wearable eyeglass device 100 to the server 300. The server 300 may perform a purchase for any product based on the user information transmitted from the wearable eyeglass device 100 and transmit purchase completion information on any product to the wearable eyeglass device 100.

The wearable eyeglass device according to an exemplary embodiment of the present invention uses optical communication (illumination) to receive the optical signal including data from the external illumination communication device and transmit the optical signal to the external illumination communication device, such that it may perform direct data communication with the external illumination communication device and display information on the eyeglass, thereby making it possible to increase convenience of the user.

Further, since the optical communication module is configured of the front surface optical communication module positioned on the front surface of the eyeglass, which is the user's gaze direction, and the side surface optical communication module positioned on the side surface of the eyeglass, the wearable eyeglass device may receive the optical signals only in the direction toward which the user's gaze or head is directed, such that it may perform the directional data communication with the illumination communication device in the gaze direction in which the intention of the user is reflected.

Various modifications and alterations may be made by those skilled in the art to which the present invention pertains without departing from the essential features of the present invention. Accordingly, exemplary embodiments disclosed in the present invention are not to limit the spirit of the present invention, but are to describe the spirit of the present invention. The scope of the present invention is not limited to exemplary embodiments. The scope of the present invention should be interpreted by the following claims, and it should be interpreted that all the spirits equivalent to the following claims fall within the scope of the present invention.

What is claimed is:

1. A wearable eyeglass device comprising:
   an optical communicator to receive a first optical signal and transmit a second optical signal, the optical communicator including:
      a front surface optical communicator positioned on a front surface of the wearable eyeglass device, which is in a gaze direction of a user, and
      a side surface optical communicator positioned on a side surface of the wearable eyeglass device;
      wherein each of the front surface optical communicator and the side surface optical communicator including:
         a light receiver to receive the first optical signal, the light receiver includes a plurality of light receiving elements to receive the first optical signal, and
         a light transmitter to transmit the second optical signal,
   a display displaying information corresponding to at least one of the first optical signal and the second optical signal; and
   a controller controlling the display to display first information corresponding to the first optical signal at a time of receiving the first optical signal, and controlling the optical communicator to transmit the second optical signal corresponding to second information according to an input based on the first information displayed through the wearable eyeglass device,
   wherein the optical communicator further includes a touch input processor judging the input as an input of the user depending on a pattern of the plurality of light receiving elements covered by the user's fingers when ambient light or the first optical signal is incident.

2. The wearable eyeglass device of claim 1, wherein the display is a beam projector displaying at least one of the first information and the second information on a lens depending on a control of the controller.

3. The wearable eyeglass device of claim 1, wherein the front surface optical communicator further includes an optical element allowing only an optical signal incident from the front surface of the wearable eyeglass device to be received.

4. The wearable eyeglass device of claim 1, wherein the plurality of light receiving elements generate a first signal corresponding to the first optical signal and transfer the first signal to the controller.

5. The wearable eyeglass device of claim 4, wherein the plurality of light receiving elements are at least one of a photo diode (PD) and an avalanche photo diode (APD).

6. The wearable eyeglass device of claim 1, wherein the light transmitter includes a plurality of light emitting elements transmitting the second optical signal.

7. The wearable eyeglass device of claim 6, wherein the plurality of light emitting elements transmit the second optical signal corresponding to a second signal transferred from the controller.

8. The wearable eyeglass device of claim 7, wherein the plurality of light emitting elements are at least one of a light emitting diode (LED), a laser diode (LD), and a solid laser.

9. The wearable eyeglass device of claim 1, wherein the touch input processor judges whether the input of the user is a touch or a drag depending on a temporal pattern of the plurality of light receiving elements covered by the user's fingers.

10. The wearable eyeglass device of claim 1, wherein the controller controls an application program and the display depending on a result of the judgment as the input of the user.

11. The wearable eyeglass device of claim 1, further comprising a data communicator transmitting and receiving data to and from an external server.

12. The wearable eyeglass device of claim 1, wherein the second information is a response by the user who is wearing the wearable eyeglass device to a request to confirm the first information displayed.

13. A method of controlling a wearable eyeglass device having a display, an optical communicator and a controller, the method comprising:

receiving, by a light receiver of the optical communicator, a first optical signal, the light receiver including a plurality of light receiving elements to receive the first optical signal and transmitting, by a light transmitter of the optical communicator, a second optical signal, the optical communicator including a front surface optical communicator positioned on a front surface of the wearable eyeglass device, which is in a gaze direction of a user, and a side surface optical communicator positioned on a side surface of the wearable eyeglass device, each of the front surface optical communicator and the side surface optical communicator including the light receiver and the light transmitter, respectively;

displaying, by the display, information corresponding to at least one of the first optical signal and the second optical signal;

controlling the display, by the controller, to display first information corresponding to the first optical signal at a time of receiving the first optical signal;

controlling the optical communicator, by the controller, to transmit the second optical signal corresponding to second information according to an input based on the first information displayed through the wearable eyeglass device, wherein the optical communicator is further configured to judge the input as an input of the user depending on a pattern of the plurality of light receiving elements covered by the user's fingers when ambient light or the first optical signal is incident.

* * * * *